United States Patent [19]

Ward et al.

[11] 4,178,844
[45] Dec. 18, 1979

[54] TWO-WAY ADJUSTABLE COOKING GRID

[76] Inventors: Frances S. Ward, 21906 10 Mile Rd., St. Clair Shores, Mich. 48080; John J. Ward, 28971 Little Mack, Apt. B-1, St. Clair Shores, Mich. 48081

[21] Appl. No.: 928,404

[22] Filed: Jul. 27, 1978

[51] Int. Cl.² ............................................. A47J 37/07
[52] U.S. Cl. ....................................... 99/449; 108/102; 108/137; 211/175; 211/182; 248/172
[58] Field of Search .................. 99/449, 450; 211/175, 211/182, 153, 43; 108/102, 111, 114, 137; 248/172

[56] References Cited

U.S. PATENT DOCUMENTS

| 311,662 | 2/1885 | Knight | 99/449 X |
|---|---|---|---|
| 573,835 | 12/1896 | Taylor | 211/175 |
| 718,714 | 1/1903 | Larson | 99/449 X |
| 1,263,863 | 4/1918 | Crosby | 99/449 |
| 1,337,043 | 4/1920 | Child | 99/449 X |
| 2,503,795 | 4/1950 | Brown | 99/449 X |
| 2,549,709 | 4/1951 | Potts | 99/449 |
| 3,585,922 | 6/1971 | Peterson et al. | 99/449 X |
| 3,975,999 | 8/1976 | Carroll | 99/449 |
| 3,998,170 | 12/1976 | Gordon | 248/172 X |

Primary Examiner—Stanley N. Gilreath
Attorney, Agent, or Firm—Basile and Weintraub

[57] ABSTRACT

A cooking grid is disclosed which is adjustable for both length and width. The grid includes special tongs that are provided to lift the grid from a cooking pan and to adjust the length and width of the grid. Removable legs are attached to the corners of the grid to elevate the roast above the roasting pan bottom, as desired.

5 Claims, 3 Drawing Figures

TWO-WAY ADJUSTABLE COOKING GRID

BACKGROUND OF THE INVENTION

1. Field of the Invention

The present invention relates to the field of cooking grills or grids, and in particular to grids that are adjustable.

2. Description of the Prior Art

The prior art known to the Inventor includes the following U.S. Pat. Nos.: 311,662; 1,263,863; 1,337,043; 2,549,709; and 3,975,999. All of the aforementioned United States patents disclose cooking grills or spits that are adjustable, however, none of the above cited references disclose a grid that is adjustable in two dimensions. U.S. Pat. No. 2,549,709 comes the closest to the present invention in that it discloses rods moving within tubes to allow an adjustment for width of the grid. However, no means for adjusting the grid in two dimensions are provided.

3. Prior Art Statement

In the opinion of the applicant the aforementioned prior art constitutes the most relevant prior art known to applicant.

SUMMARY OF THE INVENTION

The present invention comprises a pair of first and second spaced apart end tubes, each having a concentric axis. A set of parallel spaced apart tubes are attached at right angles to the first and second end tubes. A first rod is fixedly attached to center of the first end tube extending toward the second end tube a predetermined distance. The first rod slidingly engages the center of the second end tube. A multiplicity of rods are attached to the ends of the sets of tubes, the rods extending from the tubes a predetermined distance. A third and fourth end tube are disposed a distance opposite and parallel to the first and second end tubes. A third and fourth set of parallel spaced apart tubes are attached at right angles to the third and fourth end tubes, each tube in the third and fourth set being disposed opposite and concentric to a corresponding tube in the first and second set of tubes. A multiplicity of rods are fixedly attached to the ends of the first and second set of tubes. The multiplicity of rods slidingly engage the center of their opposite tube from the first and second set of parallel spaced apart tubes. A second rod is fixedly attached to the inside end of the third end tube, the rod extending a distance to slidingly engage the inside diameter of the inside end of the fourth end tube. When the aforementioned rods engage their corresponding tube a two-way adjustable grid is formed.

It is therefore an object of the present invention to provide a new and improved adjustable grid.

Other objects, advantages and applications of the present invention will become apparent to those skilled in the art of grids when the accompanying description of one example of the best mode contemplated for practicing the invention is read in conjunction with the accompanying drawings.

BRIEF DESCRIPTION OF THE DRAWING

The following description makes reference to the accompanying drawing wherein like reference refer to like components throughout the several views and wherein.

DESCRIPTION OF THE PREFERRED EMBODIMENT

Figure 1:
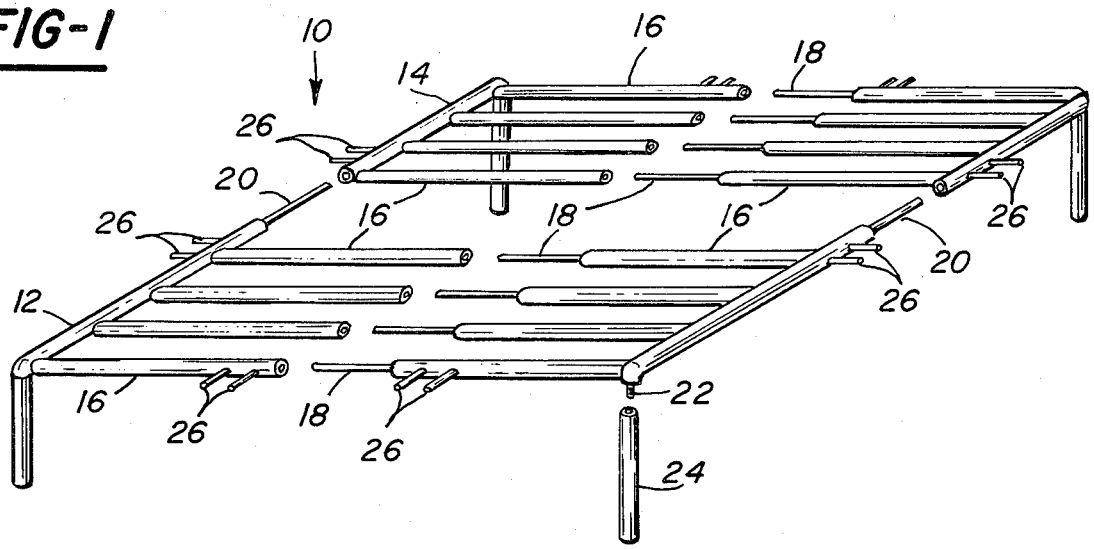
FIG. 1 is a perspective view of the novel two-way adjustable cooking grid.

Referring, now to the drawing, and in particular to FIG. 1 wherein there is illustrated a preferred embodiment of the present invention comprising a two-way adjustable grid 10 which has first and second end tubes 12 having parallel spaced apart axes. A first and second set of parallel spaced apart tubes 16 are disposed between the end tubes 12 and are attached at right angles to end tubes 12. Tubes 16 are arranged to have concentric axes with an opposite member. A multiplicity of rods 18 are fixedly attached to the inward ends of one set of tubes. The rods extend a distance to slidingly engage the inside of their opposite tube 16. A third and a fourth end tube 14 are spaced opposite and have concentric axes with but are spaced apart from the first and second tubes 12. Additional sets of parallel spaced apart tubes 16 are attached at right angles to end tubes 14, each tube 16 having a concentric axis with an opposite member. A further multiplicity of rods 18 are fixedly attached to the inward ends of tubes 16, the rods extending a distance to slidingly engage the inside of the opposite tube 16.

A pair of rods 20 are fixedly attached to the inner end of the pair of end tubes 12, the rods extend a distance to slidingly engage the center of the inside ends of end tubes 14. When the aforementioned rods have been inserted into their corresponding tube, an assembled two-way adjustable grid having four corners is formed thereby.

Four male threaded rods 22 are attached to the corners of the assembled grid and four legs 24 having a threaded aperture threadingly engage the threaded rods. Four removable legs are provided thereby.

In cooking large roasts in an oven it often is preferable to have the roast elevated above the bottom of a roasting pan to apply heat to all sides. It is desirable, too, for optimum flavor and economy to use a roasting pan properly sized for the roast. With the present invention, a single grid can fit a multiplicity of roasting pan sizes, and elevation of the roast above the bottom of the pan is possible if desired. For restaurant and commercial cooking the grid can be adjusted to the exact size of the roasts allowing the economy of cooking a larger number of roasts using individual grids in a single oven.

Figure 2:
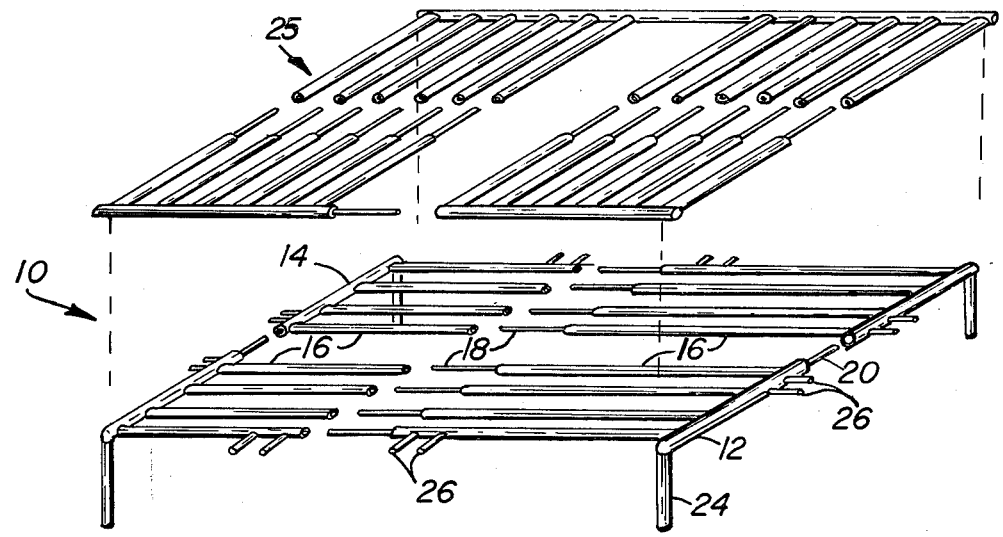
FIG. 2 is a perspective view of a second embodiment of the present invention wherein two adjustable grids at right angles are joined together at their periphery; and, FIG. 3 is a perspective view of a lifting and adjusting tong to be used in conjunction with the two-way adjustable grid.

In another embodiment of the present invention, as shown in FIG. 2, a second grid 25 is fixedly attached above the lower grid with the tubes and rods running at right angles to those in the lower grid. The grids are joined at the tubes forming the periphery. A substantial improvement in strength is possible using this configuration, and very heavy roasts such as might be used in restaurants can be accommodated thereby.

Referring again to FIG. 1, a multiplicity of lifting and adjusting pegs 26 are attached horizontally extending outwardly but at right angles to the tubes forming the periphery of the grid. The pegs 26 are disposed in pairs spaced apart and near the inner ends of the tubes forming the periphery of the grid. The bottom portion of a pair of lifting and adjusting tongs 28 (FIG. 3) are fitted under the pegs 26 on opposite sides to lift the roast from its roasting pan. The tongs have a keyhole shape with a flattened top and bottom to facilitate lifting and adjusting the size of the grid.

Figure 3:
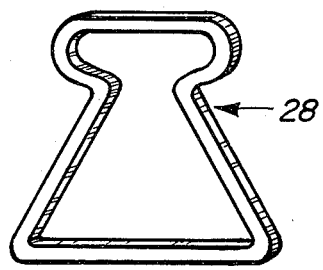

Still referring to FIG. 3 and FIG. 1, to expand the grills, the sides of the pair of tongs 28 are spaced between a pair of pegs 26 on adjacent tubes 16, and on opposite sides. The pegs 26 are placed against the outer surface of the sides of the tongs 28. Pulling the tongs up forces the pegs apart spacing the grid to a further open position. To reduce the size of the grid, the inside edges of the sides of the pair of tongs 28 are placed to straddle two pairs of pegs 26 on adjacent tubes 16 at opposite sides of the grid 10. Pressing the tongs downward forces the grid to a shorter dimension.

Many modifications and variations of the present invention are possible and obvious in light of the above teachings.

Having thus described the best mode of my invention, what I claim is:

1. A first two-way adjustable cooking grid comprising:
    a first set of parallel, spaced apart tubes perpendicularly attached to a first end tube;
    a second set of parallel spaced tubes perpendicularly attached to a second end tube, said first and second sets spaced apart from but parallel to each other, said second end tube having a first rod fixedly attached to its center and projecting therefrom to slidingly engage the open end of said first end tube;
    a third set and a fourth set of parallel, spaced apart tubes perpendicularly attached to a third and a fourth end tube, respectively, said third and fourth sets of tubes spaced opposite and coaxial with said first and said second sets of parallel, spaced apart tubes;
    a multiplicity of rods fixedly attached to the open ends of said third and fourth sets of parallel tubes, said rods extending from the open ends of said third and fourth sets of parallel tubes a distance, said multiplicity of rods slidingly engaging the open ends of said first and second sets of parallel, spaced apart tubes;
    a second rod extending from the center of said fourth end tube toward said third end tube and fixedly attached to said fourth end tube, said second rod extending therefrom a distance, said second rod slidingly engaging the open end of said third end tube; when the various rods engage their adjacent tubes, a two-way adjustable grid is formed.

2. A two-way adjustable cooking grid as defined in claim 1 comprising:
    a second adjustable cooking grid formed of rods and tubes similar to said first adjustable cooking grid and having ends fixedly attached to the first adjustable cooking grid, said second adjustable cooking grid being disposed in a plane parallel to the plane of said first adjustable cooking grid with the rods and tubes of said second cooking grid running at right angles to said rods and tubes of said first cooking grid.

3. A two-way adjustable cooking grid as defined in claim 1, said grid having disposed on its four corners removable legs for elevating said grid.

4. A two-way adjustable cooking grid as defined in claim 1, said cooking grid having a multiplicity of short lifting and adjusting pegs projecting outwardly at right angles from the tubes defining the periphery of said grid, said short pegs disposed in the plane of said grid, said pegs being located near the ends of said peripheral tubes, said pegs being spaced apart a predetermined distance.

5. A two-way adjustable cooking grid as defined in claim 4, said grid being provided with a pair of lifting and adjusting tongs, said tongs made in a continuous band of material in a modified keyhole shape, the top and bottom of said keyhole being flat, the sides of said tongs tapering outward to a width at the bottom which exceeds the spacing of said pegs on adjacent peripheral tubes when said grid is fully expanded, the narrowest part of said keyhole shape being less than the spacing of said pegs on said adjacent peripheral tubes when said grid is fully retracted, placing the bottom of said tongs under said pegs allows said grid to be lifted by said tongs, using the tapered sides of said tongs the spacing of said pegs on adjacent tubes can be altered.

* * * * *